(12) United States Patent
Douglas et al.

(10) Patent No.: US 12,041,092 B2
(45) Date of Patent: Jul. 16, 2024

(54) ROBUST AND SECURE CLOUD-BASED PLATFORM FOR DATA PROCESSING AND MANAGEMENT

(71) Applicant: Sentara Healthcare, Norfolk, VA (US)

(72) Inventors: Matthew Douglas, Virginia Beach, VA (US); Jay Canfield, Virginia Beach, VA (US); Samuel Snow, Norfolk, VA (US); Jeffrey Thomas, Smithfield, VA (US); Daniel Bowden, South Jordan, UT (US)

(73) Assignee: Sentara Healthcare, Norfolk, VA (US)

( * ) Notice: Subject to any disclaimer, the term of this patent is extended or adjusted under 35 U.S.C. 154(b) by 381 days.

(21) Appl. No.: 17/366,949

(22) Filed: Jul. 2, 2021

(65) Prior Publication Data

US 2022/0006839 A1 Jan. 6, 2022

Related U.S. Application Data

(60) Provisional application No. 63/047,773, filed on Jul. 2, 2020.

(51) Int. Cl.
*H04L 9/40* (2022.01)
*H04L 41/0869* (2022.01)

(52) U.S. Cl.
CPC .......... *H04L 63/20* (2013.01); *H04L 41/0869* (2013.01); *H04L 63/0209* (2013.01)

(58) Field of Classification Search
CPC ................. H04L 63/20; H04L 41/0869; H04L 63/0209; H04L 63/0272
USPC ............................................................. 726/1
See application file for complete search history.

(56) References Cited

U.S. PATENT DOCUMENTS

| | | | |
|---|---|---|---|
| 8,479,257 B1 * | 7/2013 | Lloyd ..................... | H04L 63/20 726/1 |
| 2012/0216243 A1 * | 8/2012 | Gill ......................... | G06F 21/55 726/1 |
| 2019/0173757 A1 * | 6/2019 | Hira ........................ | H04L 41/12 |
| 2019/0173780 A1 * | 6/2019 | Hira ....................... | H04L 45/745 |
| 2021/0096974 A1 * | 4/2021 | Ranchal ................. | G06N 20/00 |

* cited by examiner

*Primary Examiner* — Kambiz Zand
*Assistant Examiner* — Aubrey H Wyszynski
(74) *Attorney, Agent, or Firm* — Perkins Coie LLP

(57) ABSTRACT

Methods, devices and systems for providing a robust and secure cloud-based platform for data processing and management are described. In an example, a method for improving the configurability and compliance of a cloud-computing environment comprising a plurality of zones includes receiving, at a configuration engine, a plurality of parameters and a plurality of security rules for each of the plurality of zones, creating, based on the plurality of parameters, a virtual network and one or more subnets for each of the plurality of zones, and updating, based on the plurality of security rules, one or more routing tables assigned to the one or more subnets to ensure traffic to and from a zone of the plurality of zones passes through a corresponding firewall of the zone.

17 Claims, 7 Drawing Sheets

ROBUST AND SECURE CLOUD-BASED PLATFORM FOR DATA PROCESSING AND MANAGEMENT

CROSS-REFERENCE TO RELATED APPLICATION

This patent document claims priority to and benefits of U.S. Provisional Patent Application No. 63/047,773 filed on Jul. 2, 2020. The entire content of the before-mentioned patent application is incorporated by reference as part of the disclosure of this patent document.

TECHNICAL FIELD

This patent document generally relates to cloud computing, and more particularly to implementations of security and access protocols for cloud-computing environments.

BACKGROUND

Infrastructure as a service (IaaS) is a form of cloud computing that provides virtualized computing resources over the internet. These computing resources, typically installed at data centers, include physical computing resources, location services, data partitioning, scaling services, security services, backup services, and the like.

SUMMARY

Embodiments of the disclosed technology relate to a robust and secure cloud-based platform for data processing and management, and include the automated configuration of cloud-computing services for an organization of any size.

In an example aspect, a method for improving configurability and compliance of a cloud-computing environment is disclosed. The method includes receiving, at a configuration engine, a plurality of parameters and a plurality of security rules for each of the plurality of zones, creating, based on the plurality of parameters, a virtual network and one or more subnets for each of the plurality of zones, and updating, based on the plurality of security rules, one or more routing tables assigned to the one or more subnets to ensure traffic to and from a zone of the plurality of zones passes through a corresponding firewall of the zone, each of the plurality of zones being configured to host each of a plurality of workloads on the corresponding virtual network, and each of the plurality of workloads being compliant with at least one standard.

In another example aspect, a method for improving configurability and compliance of a cloud-computing environment is disclosed. The method includes receiving at least one parameter and at least one security rule for each of the plurality of zones, and for each of the plurality of zones, creating an express route with a virtual network gateway, creating, based on the at least one parameter, a virtual network and a subnet, connecting the virtual network to the express route, creating, based on the at least one security rule, a routing table and a network security guard (NSG) that are assigned to the subnet, configuring at least one of a firewall, load balancer, virtual machine, or public IP address associated with the virtual network, and updating, based on the at least one security rule, the routing table to ensure traffic to and from the zone passes through the firewall.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Embodiments of the disclosed technology, among other features and benefits, enable continuous configuration automation (CCA), which is a process of automating the deployment and configuration of settings and software for both physical and virtual data center equipment. CCA tools typically use a programmable framework for configuration and orchestration through coding, planning, and incrementally adopting policies.

CCA tools enable infrastructure (system, server and cloud) administrators and developers to automate the deployment and configuration of settings and software for physical and virtual infrastructure in a programmatic way. They enable the description of configuration states, customization of settings, software binaries deployment and configuration data reporting. CCA tools generally consist of one or more management servers (depending on scale requirements) that manage the execution of configuration tasks distributed to agents or directly to targeted resources. CCA tools provide a repository to store and manage configuration content, but can be integrated with or use (code) revision control systems in use by application development teams. The embodiments described herein provide example methods, systems and devices for applying CCA tools to a cloud-computing infrastructure.

Figure 1:
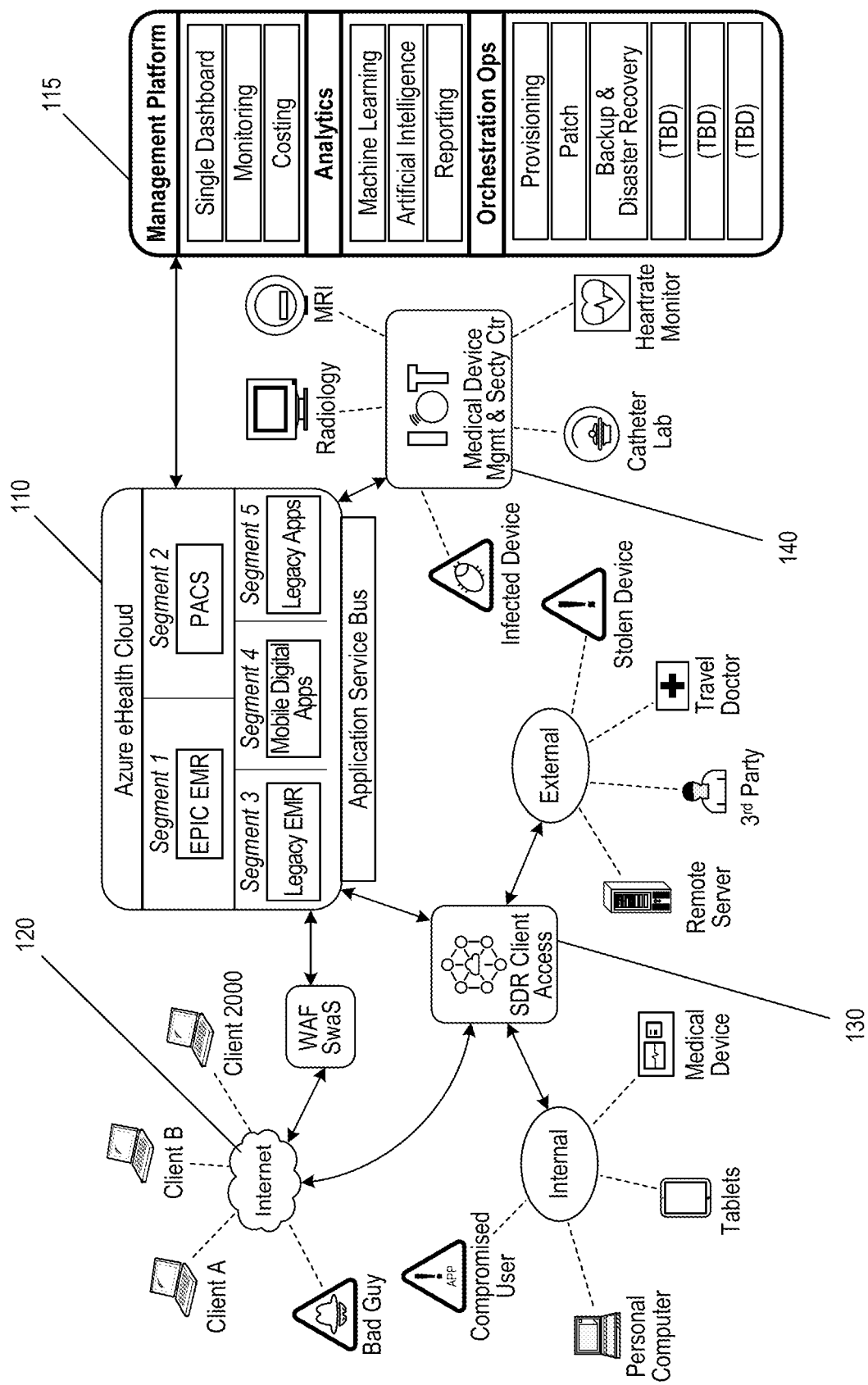
FIG. 1 illustrates an example of a cloud-computing infrastructure.

FIG. 1 illustrates an example of a cloud-computing infrastructure (e.g., Microsoft Azure, Amazon Web Services (AWS), Google Cloud Platform, and the like). As illustrated therein, a cloud-computing environment 110 can be partitioned into multiple segments (or zones), each of which can support a distinct workload. For example, the health services cloud-computing infrastructure 110 illustrated in FIG. 1 is partitioned into five segments that include Segment 1 for Electronic Privacy Info Center (EPIC) electronic medical record (EMR) formats, Segment 2 for medical imaging (which includes the Picture Archiving and Communication System (PACS)), Segment 3 for legacy EMR formats, Segment 4 for mobile digital applications, and Segment 5 for legacy applications. As will be described in the documents, these segments are configured to interact with each other, related resources (e.g., management platform, analytics and orchestrations ops 115), as well as external entities (e.g., Internet, medical devices, etc.).

Embodiments of the disclosed technology enable managing the complexity of a compartmentalized infrastructure to ensure compliance, deployment and consistent management over time in an automated fashion, therein reducing errors, boosting efficiency and lower costs associated with traditional deployment of cloud-computing infrastructures.

In some embodiments, the interactions between the different segments and the external entities are based on orchestrating and leveraging the cloud-computing infrastructure application programming interfaces (APIs; e.g., the Microsoft Azure API) as well as the third-party APIs.

As illustrated in FIG. 1, the health services cloud-computing infrastructure 110 can interact with external entities including the internet 120 (that comprises one or more clients, and which are accessed through a Website Application Firewall (WAF)), Software-Defined Radio (SDR) Client Access 130 (that enables access to remote SDR receivers throughout the internet) and an Internet-of-Things (IoT) medical device management and security center (that enables access to a plethora of medical devices). However, each of these external entities is susceptible to hosting a compromised or infected device (e.g., stolen device or infected medical device).

In some embodiments, the cloud-computing infrastructure 110 is configured to ensure the compromised or infected device does not breach the cloud-computing infrastructure. This may be achieved by configuring the security permissions and read/write access for each segment individually, and ensure that only a single data ingress/egress point exists for each segment so that all the incoming and outgoing traffic can be monitored.

In some embodiments, the configuration of the security permissions and read/write access for each segment is not advertised or provided to any other entity. In this scenario, the "security through obscurity" paradigm is implemented in that only the subscriber(s) of the cloud-computing infrastructure have knowledge of the configuration of the zones they are using.

Figure 2:
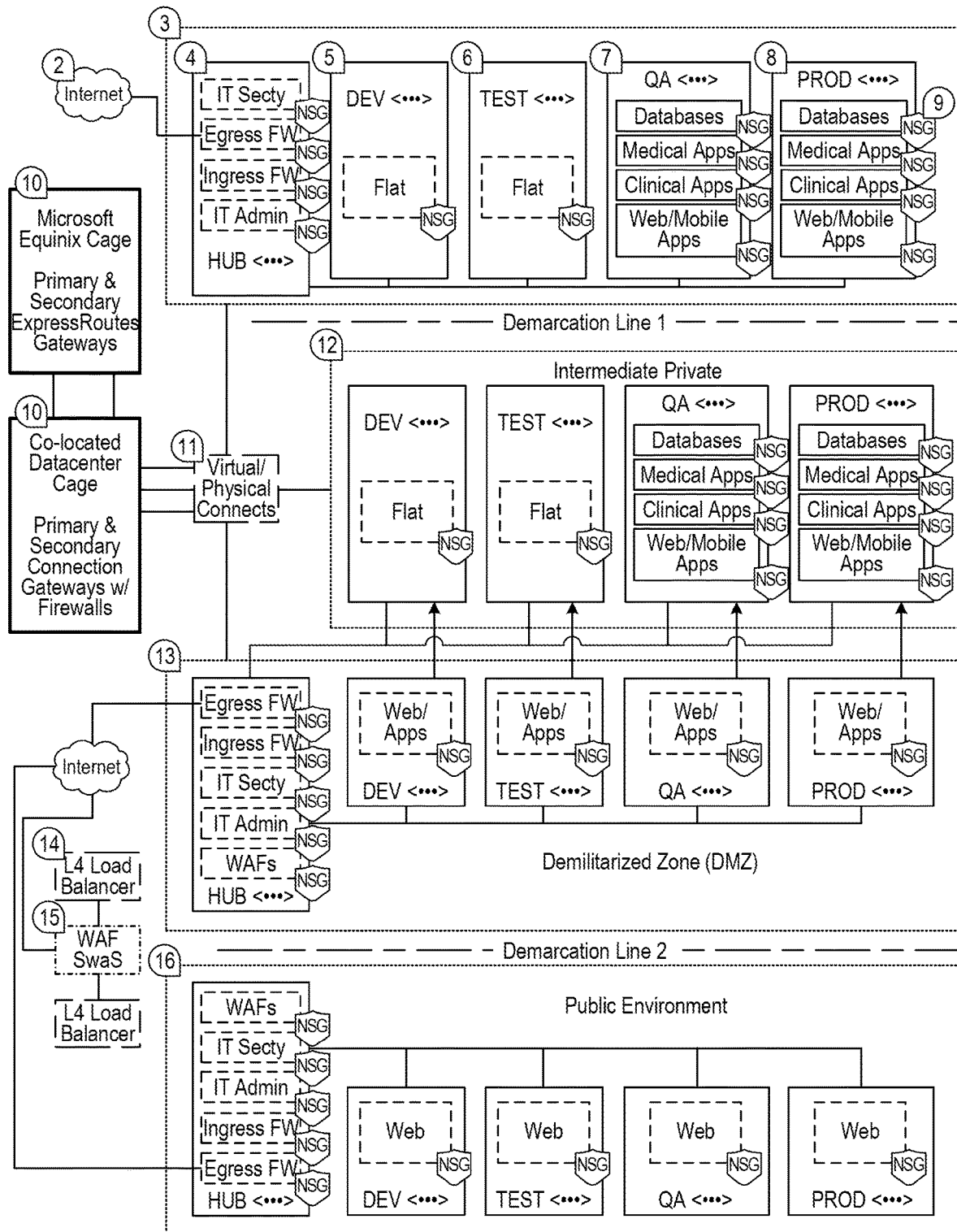
FIG. 2 illustrates another example of a cloud-computing infrastructure.

FIG. 2 illustrates another example of a cloud-computing infrastructure. As illustrated therein, a data center is connected to multiple environments through a data traffic gateway service. The components illustrated in FIG. 2 include:

[1] A data center that includes the main computer network and data storage hub for the Electronic Privacy Information Center (EPIC) and other healthcare digital services. The data center typically consists of servers and data storage assets. In some embodiments, the data center maintains two redundant gateways to a colocation service.

[2] Developers in the different environments have access to the internet and third-party application services via network security guards (NSGs) and/or egress firewalls.

[3] The private environment is hosted on the cloud-computing infrastructure, and consists of, in an example, five deployment subscription virtual networks (VNets): Hub (HUB), Development (DEV), Testing (TEST), Quality Assurance (QA) and Production (PROD). In some embodiments, each subscription contains redundant subnets for Medical/Clinic-Mobile/Web (M/C-M/W) applications and their corresponding databases. Subscription VNets from the private environment sends software development code information to the demilitarized (DMZ) environment via the gateway routing services.

[4] The HUB subscription is a VNet environment that is used to host firewalls for safeguarding and regulating data to/from the DEV, TEST, QA and PROD subscription VNets. In an example, the firewalls may be Nessus, Fortinet and/or NGiNX+ Web Application Firewall.

[5] The DEV subscription is a VNet environment for on-premises and/or remote software developers to collaborate software coding. In an example, the DEV subscription may be the first stage of a M/C-M/W application development process.

[6] The TEST subscription is a VNet subscription for on-premises software development employees to test application code received from the DEV subscription environment. In an example, the TEST subscription may be the second stage of a M/C-M/W application development process.

[7] The Quality Assurance (QA) subscription is a VNet subscription for on-premises software development employees to evaluate application code received from the TEST subscription environment. In an example, the QA subscription may be the third stage of a M/C-M/W application development process.

[8] The PROD subscription is the last and final stage of a software program development process. When a M/C-M/W application has completed its development process, the software program is put online in the public environment's PROD subscription for public use.

[9] The network security group (NSG) is a tool used to enforce and control network traffic rules at the networking level. In an example, the NSG contains security rules that allow or deny inbound/outbound network traffic to or from various resources of the cloud-computing infrastructure.

[10] The colocation service, which typically provides auxiliary resources (e.g., space, power, cooling, physical security for the server, etc.) for the data center assets, provides two redundant 1 Gigabit (Gb) connections between the data center and the data traffic gateway service. In an example, the 1 Gb connection may be a 1 Gb Ethernet Private Line (EPL). In some embodiments, the connections speed up and control traffic flow.

[11] A data traffic gateway service designed to improve speed performance and ensure users receive the same quality experience wherever they are located in the world.

[12] The intermediate private environment (IPE) provides a semi-private working environment for developers that have deployment subscription VNets: DEV, TEST, QA, PROD and HUB.

[13] The demilitarized zone (DMZ) environment is hosted on the cloud-computing infrastructure, and provides a semi-private working environment for developers that have deployment subscription VNets: DEV, TEST, QA, PROD and HUB. As illustrated in FIG. 2, the demilitarized zone environment is the only environment that receives software development code from the private environment, and the DEV, TEST, QA and PROD VNets use a unidirectional interface to communicate with the Intermediate Private Environment.

[14] A Layer 4 load balancer is used to speed-up access to the demilitarized zone and public environments by redirecting traffic based on server response time.

[15] The Web Application Firewall (WAF) provides online WAF cloud security services for access to either the demilitarized zone or public environments.

[16] The public environment is identical to the demilitarized zone environment; both have the same deployment subscription VNets and both do not require database servers for their Web/App subnets. In some embodiments, the public environment is strictly designated for public users to access Web/Apps. In other embodiments, public users in the public environment are completely isolated from the private, intermediate private and DMZ environments.

Figure 3A:
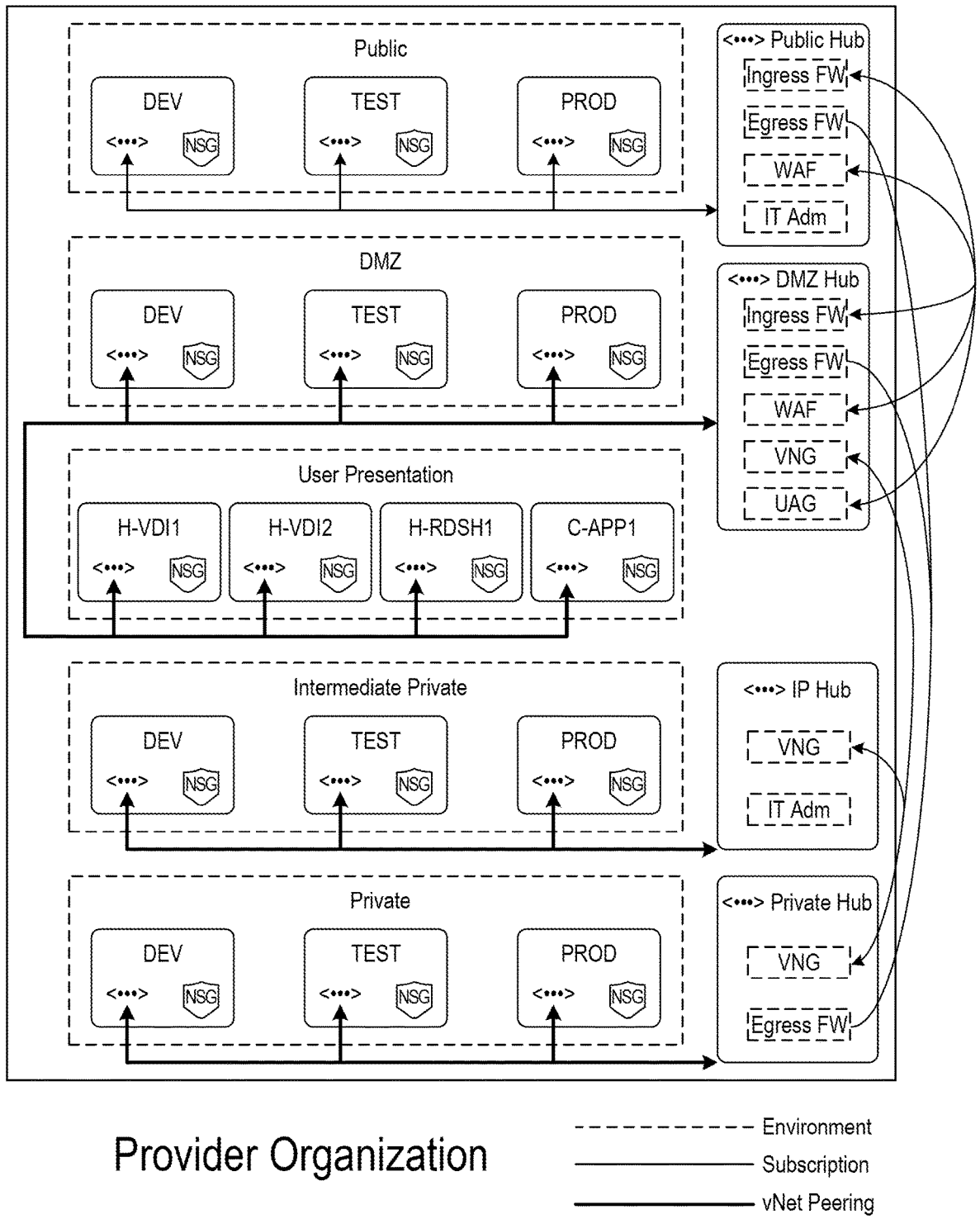
FIGS. 3A, 3B and 3C illustrate yet another example of a cloud-computing infrastructure.
Figure 3B:
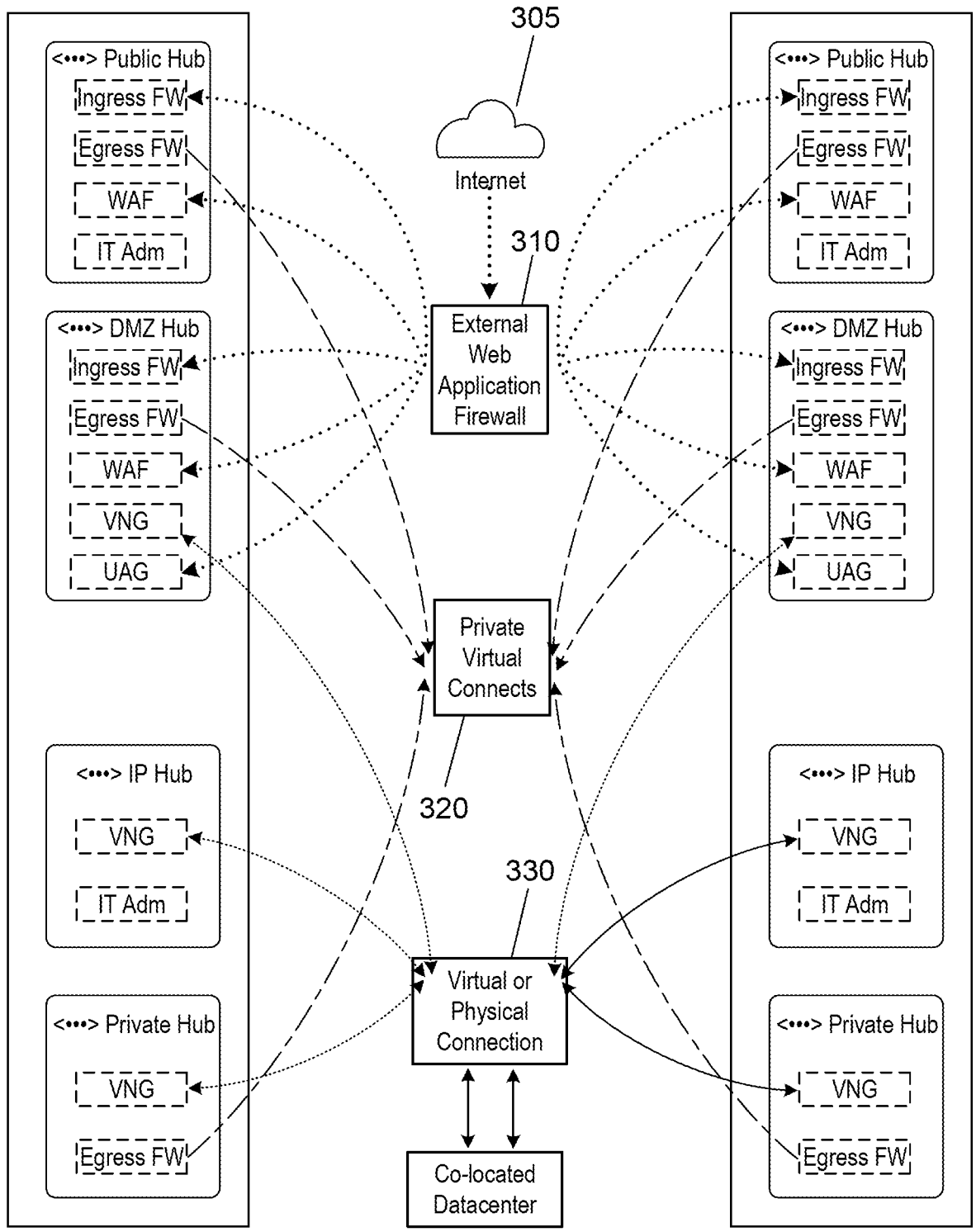
Figure 3C:
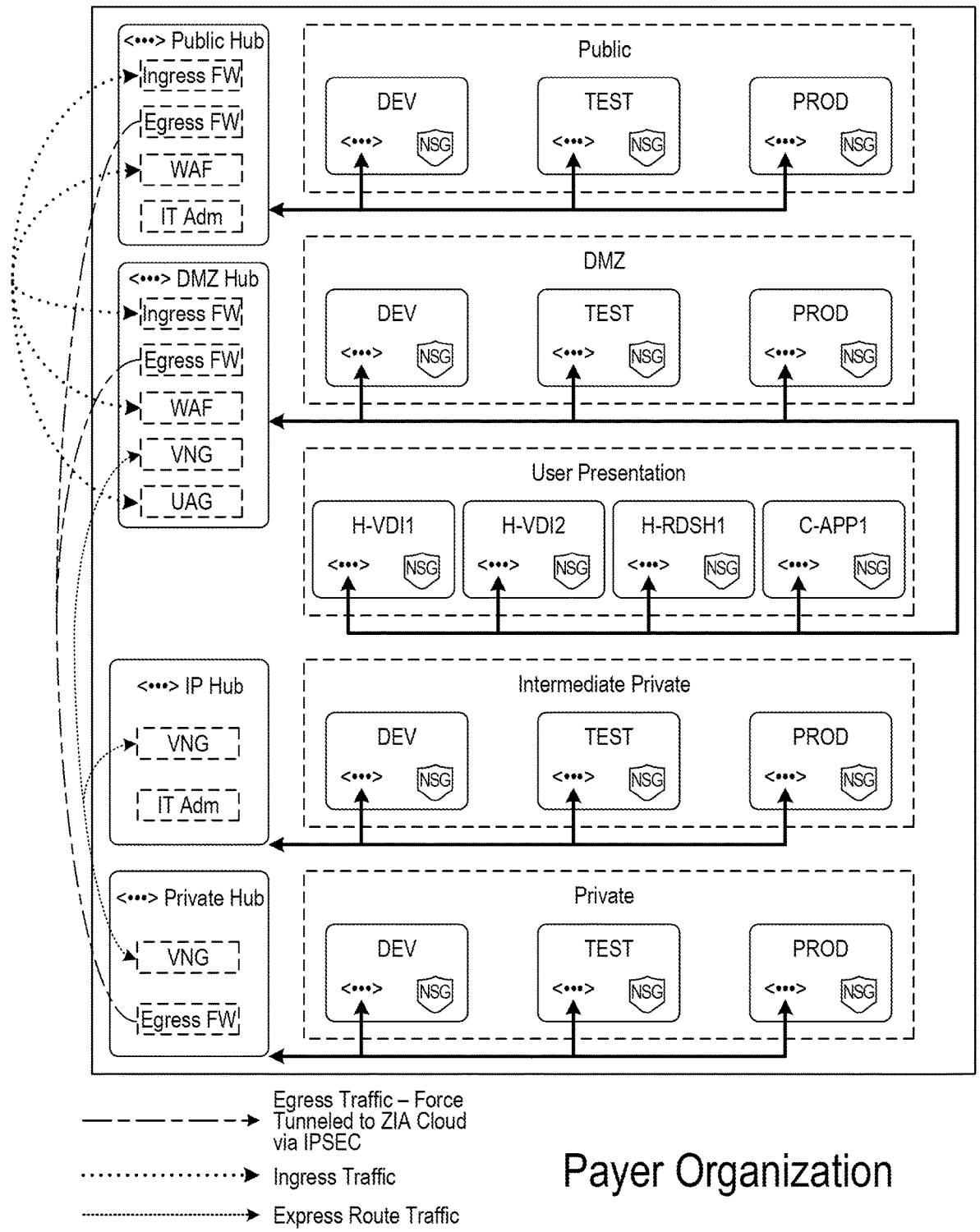

FIGS. 3A, 3B and 3C illustrate yet another example of a cloud-computing framework or infrastructure. FIGS. 3A and 3C illustrate multiple environments in the cloud-computing infrastructure on the healthcare organization and health insurance sides, respectively. FIG. 3B illustrates the communication between the two entities in FIGS. 3A and 3C via the WAF 310, the security-as-a-service (SaaS) cloud platform 320, and the data traffic gateway service 330. As illustrated therein, the egress traffic from each of the Hub environments on both the healthcare organization and health insurance sides is configured to tunnel through the SaaS cloud platform 320. In an example, the tunneling of all the egress traffic uses IP Security (IPSEC). The ingress traffic from the internet 305 is routed through the WAF 310 prior to being received either by the healthcare organization side or the health insurance side.

In some embodiments, the frameworks illustrated in FIGS. 1, 2 and 3A-3C are designed around Health Insurance Portability and Accountability Act (HIPAA), National Institute of Standards and Technology (NIST) and Health Information Trust Alliance (HITRUST) standards, which ensures maintaining compliance and consistency in operation. Currently available CCA tools do not provide compliance frameworks and guides.

The HIPAA-, NIST- or HITRUST-compliant framework enables the deployment of architecture with zero trust (also referred to as a zero trust security model). This results in the described embodiments implementing mutual authentication, including checking the identity and integrity of devices without respect to location, and providing access to applications and services based on the confidence of device identity and device health in combination with user authentication. For example, and described in the context of FIGS. 1, 2 and 3A-3C, device and user authentication and authorization are performed before a session to an enterprise resource is established. The described embodiments can, for example, be implemented to be compliant with NIST 800-207, which describes zero trust architectures for enterprise systems.

In some embodiments, the cloud-computing framework described in this document may be implemented using decentralized core routing in the cloud. In an example, this may be achieved by configuring routers to accept advertised routes from other routers by default.

Embodiments of the disclosed technology implement a level of security, control and standards compliance that are not currently available in existing CCA tools.

In some embodiments, the disclosed cloud-computing infrastructure can provide security indemnity based on all egress/ingress traffic being forced to route through a firewall for each zone (or segment) of the cloud-computing infrastructure, and automatically disabling network connectivity is any traffic attempts to bypass the firewall.

In some embodiments, the cloud-computing infrastructure includes the intermediate private environment, which provides a semi-private working environment for developers that have deployment subscription VNets: DEV, TEST, QA, PROD and HUB. In an example, the DEV, TEST, QA and PROD VNets of the DMZ environment use a unidirectional interface to communicate with the Intermediate Private Environment. In another example, public users in the public environment are completely isolated from the intermediate private environment.

Embodiments of the disclosed technology advantageously enable the healthcare payer and provider to remain segregated within the same subscription. In an example, this is achieved by hosting the payer and provider in separate zones, and configuring their interactions to enable the minimal level of interaction required.

In some embodiments, the automated configuration that manages the complexity of a compartmentalized infrastructure to ensure compliance, deployment and consistent management over time would otherwise require custom integration and coding of multiple partner commercial products, which typically results in errors due to the complexity of the infrastructure.

Embodiments of the disclosed technology provide data segmentation and control at the framework level, as well as coordinating ingress/egress traffic through the Hub environment, has not been implemented in existing CCA tools.

In some embodiments, the cloud-computing framework described in this document uses subscriptions to partition environments and zones, e.g., private-production and dmz-test. In an example, the subscriptions are grouped into management groups to provide multiple layers of access. Examples of the access layers include:
1. Management group
2. Subscription
3. Resource group
4. Cloud-computing infrastructure (e.g., Azure) resource
5. Virtual machine
6. Application In some embodiments, all virtual networks in the cloud-computing infrastructure must go through a firewall to access another virtual network. This advantageously provides enhanced security over traditional methods as any traffic that transverses to another environment or zone can be inspected, blocked, or logged. All traffic is forced through these firewalls using routing tables and any attempts to bypass this security measure will fundamentally cut off all network connectivity. Another layer of security that may be configured is each subnet having a network security group (NSG). In some embodiments, all VNet to VNet network connections must transverse a minimum of 2 NSGs and 1 firewall. All ingress/egress internet connections use designated firewalls to control and monitor all traffic for data loss prevention and security.

In some embodiments, multiple zones for application infrastructure placement can be configured, and security within and between zones can be managed and monitored. In an example, four primary zones consisting of 1-to-1 VNets-to-subscriptions that separate the DEV, TEST, PROD and Hub environments are illustrated in the following table.

TABLE 1

Example zone configurations

| Zone | Internet-facing (inbound) | Internet-facing (outbound) | Internal-facing | Cross-zone |
| --- | --- | --- | --- | --- |
| Public | Ok | Ok | Inbound | No |
| DMZ | Ok | Ok | Inbound | Intermediate Private |
| Intermediate Private | No | Ok | Ok | DMZ |
| Private | No | Ok | Ok | No |

The zones described in Table 1 are summarized as follows:

The public zone is configured to host services that can function independently without access from internal resources or other zones. In some embodiments, access from the internal network is limited to only remote access protocols for management. In other embodiments, services in the public zone are primarily accessed through the internet.

The DMZ zone is configured to host services that can be accessed over the internet, and typically have limited access to other resources on the internal network. The DMZ zone primarily communicates with the intermediate private zone.

The intermediate private zone is configured to host services that can themselves host the backend for services that can be accessed over the internet in the DMZ zone. In some embodiments, the services cannot be accessed directly over the internet.

The private zone is configured to host services for internal use only. In some embodiments, services that deal with any kind of internet facing application cannot communicate with service in the private zone.

Embodiments of the disclosed technology include an automation method that uses configuration files comprising values for parameters to execute automation scripts. In an example, the configuration file may be a comma-separated values (CSV) file. The disclosed embodiments advantageously overcome limitations of existing cloud-computing infrastructures that do not support multi-subscription deployments. That is, a typical multi-subscription deployment would require manual configuration which would take at least several weeks and would be prone to error, whereas embodiments of the disclosed technology achieve the same deployment in a few hours and with minimal errors, if any.

An example script that can be used to support a multi-subscription deployment in a cloud-computing infrastructure includes, but it not limited to, the following operations:

1. Create new blank subscriptions and management groups for each zone
2. Create an express route with a virtual network gateway
3. Create virtual networks and required subnets for the infrastructure
4. Connect the virtual networks in the Hub subscriptions to the express route
5. Create the virtual network peering (which enables two VNets in the same region to connect and communicate without setting up VPN Gateways)
6. Create route tables and NSGs, and assign then to the subnets
7. Deploy firewalls, load balancers, virtual machines, public IP addresses
8. Update route tables with user-defined routes to force traffic through firewalls In an example, the operations enumerated above can be implemented using shell scripts (e.g., using PowerShell) that can be configured to process comma-separated value (CSV) input files to generate the required architecture. Various examples of these scripts are shown below to provide a better understanding of the technical solution (which includes automating the setup of a cloud computing architecture) provided by embodiments of the disclosed technology.

By the way of example and not by limitation, operation (1) can be implemented using the following PowerShell script, wherein placeholders for gateways, firewalls and applications can be set up as part of the routing framework (e.g., using AzRouteTable, which is a cmdlet that enables the creation and configuration of an Azure route table) for a virtual network.

```
$org = "sen-*"
$subs = get-azsubscription where   | {$_.name -like $org -and $_. State -notlike
"Disabled"}
foreach($sub in $subs)
{
  $info = Select-AzSubscription -SubscriptionName $sub.name
  $message = $info.Subscription.Name + ", has been selected."
  Write-output $message
  $vnet = Get-AzVirtualNetwork
  if($vnet)
  {
    $rt = $null
    if($sub.name -like "*servicelayer*")
    {
      $rt = Get-AzRouteTable where   | {$_.name -like
$vnet[0].ResourceGroupName.Replace("-rg-networking-","-rt-gateway-") }
      if(!$rt)
      {
        New-AzRouteTable -ResourceGroupName $vnet[0].ResourceGroupName -Name
$vnet[0].ResourceGroupName.Replace("-rg-networking-","-rt-gateway-") -Location
$vnet[0].Location
```

```
          }
       }
       $rt = Get-AzRouteTable   |   where {$_.name -like
$vnet[01.ResourceGroupName.Replace("-rg-networking-","-rt-firewallinternal-") }
          if(!$rt)
          {
             New-AzRouteTable -ResourceGroupName $vnet[0].ResourceGroupName -Name
$vnet[0].ResourceGroupName.Replace("-rg-networking-","-rt-firewallinternal-") -
Location $vnet[0].Location
          }
       $rt = Get-AzRouteTable   |   where {$_.name -like
$vnet[0].ResourceGroupName.Replace("-rg-networking-","-rt-applications-") }
          if(!$rt)
          {
             New-AzRouteTable -ResourceGroupName $vnet[0].ResourceGroupName -Name
$vnet[0].ResourceGroupName.Replace("-rg-networking-","-rt-applications-") -Location
$vnet[0].Location
          }
      }
   }
}
```

By the way of example and not by limitation, operation (5) can be implemented using the following PowerShell script, wherein virtual networks can be peered with each other and can be configured to always allow traffic forwarding, and when enabled, to use remote gateways and allow gateway transit capabilities.

```
$peers    =   Import-Csv    -Path "C:\Users\sesnow\Documents\BitBucket\infrastructure-
azure\SamSnows_Azure_Script_Repo\Deploy_Cloud2\vnetpeerings.csv"
$peers   |   Format-Table
$currentContext = Get-AzContext
function CheckAZContext
{
   Param([String]$NewSubName)
   if($NewSubName -notlike $currentContext.Subscription.Name)
   {
      Write-Output "Selecting new Subscription $($NewSubName)"
      $script:currentContext = Select-AzSubscription -Subscription $NewSubName
      $currentContext
   }
}
if($ApplicationTag)
{
   $tags = @{Application = "Azure Cloud Infrastructure"}
}
foreach($peer   in $peers )
{
   if($peer.skip -notlike "yes")
   {
      $VNET1Tovnet2 = ($peer.vnet1 + "-to-" − $peer.vnet2)
      $VNET2Tovnet1 = ($peer.vnet2 + "-to-" − $peer.vnet1)
      Write-output "Adding peering # $($VNET1Tovnet2)"
      CheckAZContext -NewSubName $peer.subscription1
      $VNET = AzVirtualNetwork    |   where {$_.Name -like $peer.vnet1}
      CheckAZContext -NewSubName $peer.subscription2
      $VNETpeer = Get-AzVirtualNetwork | where {$_.Name -like $peer.vnet2}
      if($VNETpeer -eq $null -or $VNET -eq $null )
      {
         Write-Warning "A vnet not found, Perr not created"
         continue
      }
      if($peer.newVNETremotegateways -like "yes")
      {
         $NoOutPut = Add-AzVirtualNetworkPeering -Name $VNET2Tovnet1 -VirtualNetwork
$VNETpeer -RemoteVirtualNetworkId $VNET.Id -AllowForwardedTraffic -UseRemoteGateways
         CheckAZContext -NewSubName $peer.subscription1
         $NoOutPut =Add-AzVirtualNetworkPeering -Name $VNET1Tovnet2 -VirtualNetwork
$VNET -RemoteVirtualNetworkId $VNETpeer.Id -AllowForwardedTraffic -AllowGatewayTransit
      }
      else
      {
         $NoOutPut = Add-AzVirtualNetworkPeering -Name $VNET2Tovnet1 -VirtualNetwork
$VNETpeer -RemoteVirtualNetworkId $VNET.Id -AllowForwardedTraffic
         CheckAZContext -NewSubName $peer.subscription1
         $NoOutPut = Add-AzVirtualNetworkPeering -Name $VNET1Tovnet2 -VirtualNetwork
$VNET -RemoteVirtualNetworkId $VNETpeer.Id -AllowForwardedTraffic
      }
```

```
    Write-Output "Peering complete $($peer.vnet1) to $($peer.vnet2)"
  }
  else
  {
    write-warning "skipping peer"
  }
}
```

An example input CSV file for the virtual network peering script includes:

```
sen-mgmt-servicelayer-01,sen-mgmt-servicelayer-vn-01,sen-dmz-servicelayer-01,sen-dmz-servicelayer-vn-01,,yes
sen-mgmt-servicelayer-01,sen-mgmt-servicelayer-vn-01,sen-intpriv-servicelayer-01,sen-intpriv-servicelayer-vn-01,,yes
sen-mgmt-servicelayer-01,sen-mgmt-servicelayer-vn-01,sen-priv-servicelayer-01,sen-priv-servicelayer-vn-01,,yes
```

By the way of example and not by limitation, operation (3) can be implemented using the following PowerShell script, wherein components of the virtual network (e.g., gateways, subnets, and virtual network peering) can be configured. For example, configuring the gateway includes setting up subnets, and for each subset, creating a public IP address, the virtual network gateway and an express route (e.g., Azure ExpressRoute or AWS Direct Connect) circuit.

```
$VNETs = Import-Csv -Path "CloudFrameworkDeployment\FrameworkAutomation\Create-VNETS.csv"
$VNETs | Format-Table
$currentContext = Get-AzContext
function CheckAZContext
{
   Param([String]$NewSubName)
   if($NewSubName -notlike $currentContext.Subscription.Name)
   {
      Write-Output "Selecting new Subscription $($NewSubName)"
      $script:currentContext = Select-AzSubscription -Subscription $NewSubName -ErrorAction Stop
      $currentContext
   }
}
foreach($newVNET in $VNETs)
{
   if($newVNET.skip -ne "yes")
   {
      $tags = @{Application = "Azure Cloud Infrastructure";Environment="$($newVNET.subscription.Split('-') [2].ToUpper( ))"}
      Write-Output "########################################"
      Write-Host "Starting $($newVNET.name)"-ForegroundColor Black -BackgroundColor Yellow
      Write-Output "########################################"
      CheckAZContext -NewSubName $newVNET.subscription
      $RGCheck = Get-AzResourceGroup | where {$_.ResourceGroupName -like $newVNET.rg}
      if(!$RGCheck){New-AZResourceGroup -Name $newVNET.rg -Location $newVNET.location -Tag $tags}
      $VNET = New-AZVirtualNetwork -Name $newVNET.name -ResourceGroupName $newVNET.rg -Location $newVNET.location -AddressPrefix $newVNET.addressspace -Tag $tags
      if($newVNET.gateway)
      {
         $junk = Add-AZVirtualNetworkSubnetConfig -Name GatewaySubnet -VirtualNetwork $VNET -AddressPrefix $newVNET.gateway
         $junk = $VNET = Set-AZVirtualNetwork -VirtualNetwork $VNET
         Write-Output "Gateway subnet added"
         if($newVNET.routename)
         {
            $routeSub = $newVNET.routesub
            #$routeSub = "sen-intprivhub-prod-01"
            $routeName = $newVNET.routename
            $subnet = $VNET.Subnets | where {$_.Name -like "GatewaySubnet"}
            Write-Output "creating public IP"
            $ngwpip = New-AZPublicIpAddress -Name $newVNET.name.Replace("vn","pip-expressroute") -ResourceGroupName $newVNET.rg -Location $newVNET.location -AllocationMethod Dynamic -Tag $tags
            $ngwipconfig = New-AZVirtualNetworkGatewayIpConfig -Name ngwipconfig -SubnetId $subnet.Id -PublicIpAddressId $ngwpip.Id
```

```
        Write-Output "creating VNG"
            $VNetGateway      =      New-AZVirtualNetworkGateway      -Name
$newVNET.name.Replace("vn","gw-expressroute") -ResourceGroupName $newVNET.rg -Location
$newVNET.location   -IpConfigurations   $ngwIpConfig   -GatewayType   "ExpressRoute"   -
GatewaySku "HighPerformance"-Tag $tags
            CheckAZContext -NewSubName $routeSub
            $ExpCircuit  =  Get-AZExpressRouteCircuit   |   where {$_. name -like
$routeName}
            $authorization       =       Get-AZExpressRouteCircuitAuthorization       -
ExpressRouteCircuit $ExpCircuit | where {$_.Name -like $VNetGateway.name}
        if(!$authorization)
            {
            Add-AZExpressRouteCircuitAuthorization       -ExpressRouteCircuit
$ExpCircuit -Name $VNetGateway.name
            Set-AZExpressRouteCircuit -ExpressRouteCircuit $ExpCircuit
            $ExpCircuit = Get-AZExpressRouteCircuit | where {$_.name -like
$routeName}
            $authorization    =   Get-AZExpressRouteCircuitAuthorization    -
ExpressRouteCircuit $ExpCircuit | where {$_.Name -like $VNetGateway.name}
            }
            CheckAZContext -NewSubName $newVNET.subscription
            New-AZVirtualNetworkGatewayConnection -ConnectionType "ExpressRoute" -
Location   $newVNET.location   -Name   $newVNET.name.Replace("vn","con-expressroute") -
ResourceGroupName $newVNET.rg -VirtualNetworkGateway1 $VNetGateway -AuthorizationKey
$authorization.AuthorizationKey
            -PeerId $ExpCircuit.id -Tag $tags
        }
    }
    if($newVNET.subnets)
    {
        $newVNETsubnetnames = $newVNET.subnets.Split("|")
        $newVNETsubnetaddress = $newVNET.subnetaddress.Split("|")
        for($x = 0;$x -lt $newVNETsubnetnames.Count;$x++)
        {
        $junk = Add-AZVirtualNetworkSubnetConfig -Name $newVNETsubnetnames[$x]
-VirtualNetwork $VNET -AddressPrefix $newVNETsubnetaddress[$x]
        }
    }
    if($newVNET.subnets)
    {
        $junk = $VNET = Set-AZVirtualNetwork -VirtualNetwork $VNET
    }
    if($newVNET.peervnet)
    {
        $newVNETpeerings = $newVNET.peervnet.Split("|")
        $newVNETpeersubs = $newVNET.peersub.Split("|")
        $newVNETremotegateways = $newVNET.useremotegateway.Split("|")
        Write-output "This VNET has peerings"
        for($i = 0;$i -lt $newVNETpeerings.Count;$i++)
        {
        Write-output "Adding peering # $($i)"
        $VNET1Tovnet2 = ($newVNET.name + "-to-" + $newVNETpeerings[$i])
        $VNET2Tovnet1 = ($newVNETpeerings[$i] + "-to-" + $newVNET.name)
        CheckAZContext -NewSubName $newVNETpeersubs[$i]
        $VNETpeer   =   Get-AzVirtualNetwork   |   where {$_.Name   -like
$newVNETpeerings[$i]}
            if($VNETpeer -eq $null)
            {
            Write-Warning "VNET $($VNETName1) not found, Peer not created"
            }
            if($newVNETremotegateways[$i] -like "yes")
            {
            $NoOutPut   =   Add-AzVirtualNetworkPeering   -Name $VNET2Tovnet1   -
VirtualNetwork   $VNETpeer   -RemoteVirtualNetworkId   $VNET.Id -AllowGatewayTransit   -
AllowForwardedTraffic
            CheckAZContext -NewSubName $newVNET.subscription
            $NoOutPut   =   Add-AzVirtualNetworkPeering   -Name   $VNET1Tovnet2 -
VirtualNetwork   $VNET   -RemoteVirtualNetworkId   $VNETpeer.Id   -UseRemoteGateways   -
AllowForwardedTraffic
            }
            else
            {
            $NoOutPut   =   Add-AzVirtualNetworkPeering   -Name   $VNET2Tovnet1 -
VirtualNetwork $VNETpeer -RemoteVirtualNetworkId $VNET. Id -AllowForwardedTraffic
            CheckAZContext -NewSubName $newVNET.subscription
            $NoOutPut   =   Add-AzVirtualNetworkPeering   -Name   $VNET1Tovnet2 -
VirtualNetwork $VNET -RemoteVirtualNetworkId $VNETpeer.Id -AllowForwardedTraffic
            }
```

```
        Write-Output      "Peering     complete     $($newVNET.name)     to
$($newVNETpeerings[$i])"
      }
    }
  }
}
else
{
    write-warning "skipping VNET $($newVNET.name)"
  }
}
```

An example input CSV file for the virtual network creation script includes:

sen-publichub-prod-01,sen-publichub-prod-vn-01,sen-publichub-prod-rg-networking-01,192.168.0.0/21, 192.168.7.240/28,,,,,eastus,sen-publichub-prod-sn-ingressfw-01|sen-publichub-prod-sn-waf-01|sen-publichub-prod-sn-itadmin-01,192.168.7.224/28|192.168.7.208/28|192.168.7.128/26 sen-dmzhub-prod-01,sen-dmzhub-prod-vn-01,sen-dmzhub-prod-rg-networking-01,10.12.64.0/21, 10.12.71.240/28,,,,SEN_CLOUD|sen-intprivhub-prod-01, eastus,sen-dmzhub-prod-sn-01-ingressfw-01|sen-dmzhub-prod-sn-01-waf-01|sen-dmzhub-prod-sn-01-vng-01|sen-dmzhub-prod-sn-01-uag-01,10.12.71.224/28|0.12.71.208/28|0.12.71.160/27|10.12.71.128/27 sen-intprivhub-prod-01,sen-intprivhub-prod-vn-01,sen-intprivhub-prod-rg-networking-01,10.12.32.0/21, 10.12.39.240/28,,,,SEN_CLOUD|sen-intprivhub-prod-01, eastus,sen-intprivhub-prod-sn-itadmin-01,10.12.39.128/26 sen-privhub-prod-01,sen-privhub-prod-vn-01,sen-privhub-prod-rg-networking-01,10.12.0.0/21,10.12.7.240/ 28,,,,SEN_CLOUD|sen-intprivhub-prod-01,eastus,sen-privhub-prod-sn-01-egressfw-01,10.12.7.224/28

By the way of example and not by limitation, operation (8) can be implemented using the following PowerShell script, wherein routes can either be built from scratch, i.e., after deleting existing routing tables, or existing routing tables can be updated. In an example, the route table can be defined using one-hop entries.

```
$currentContext = Get-AzContext
function CheckAZContext
{
  Param([String]$NewSubName)
  if($NewSubName -notlike $currentContext.Subscription.Name)
  {
    Write-Output "Selecting new Subscription $($NewSubName)"
    $script:currentContext = Select-AzSubscription -Subscription $NewSubName
  }
}
Function UpdateRouteTables
{
  Param
  (
  $Routes,
  $routeName,
  $subscription
  )
  $freshStart = $true
  #Troubleshooting and testing
  #$routeName = "testrt"
  #$subscription = "Cloud_Engineering_Sandbox"
  CheckAZContext $subscription
  #Select-AzSubscription $subscription
  $Routes = $Routes.Replace(" next-hop ","|")
  $Routes = $Routes -Split "`n"
  $rt = Get-AzRouteTable | where {$_.Name -like $routeName}
  if(!$rt){write-warning "no route table found"}
  if($freshStart)
  {
    Write-Output "FreshStart set, deleting all routes"
    [int]$totalRoutes = $rt.Routes.Count
    $routeNamesToDelete = $rt.Routes | select name
    for($i = 0;$i - lt $totalRoutes;$i++)
    {
      $rt = $rt | Remove-AzRouteConfig -Name $routeNamesToDelete[$i].Name
    }
    $rt =$rt | Set-AzRouteTable
  }
```

```
foreach($Route in $Routes)
{
    $junk = $rt | Add-AzRouteConfig -AddressPrefix $Route.Split("|") [0] -Name
($Route.Split("|")[0]).Replace("/","-") -NextHopType VirtualAppliance -
NextHopIpAddress $Route.Split("|") [1]
}
    $junk = $rt | Set-AzRouteTable
}
```

By the way of example and not by limitation, subscriptions can be created using the following PowerShell script:

```
#Path to subscription information
$newsubs    = Import-Csv   -Path    "CloudFrameworkDeployment\FrameworkAutomation\Create-
Subs.csv"
#Enrolemnt ID for subscription creations
$EnrollmentAccountObjectId = ""
foreach($newsub in $newsubs)
{
    Write-Output "Creating new Sub $($newsub.Name)"
    $sub    =   New-AzSubscription   -Name    $newsub.Name   -EnrollmentAccountObjectId
$EnrollmentAccountObjectId -OfferType MS-AZR-0017P
    New-AzManagementGroupSubscription    -GroupName    $newsub.ManagementGroupName    -
SubscriptionId $sub.SubscriptionId
}
Get-AzSubscription    |   where-object {$_.name -like 'sen-*'}   |   Select-Object Name
```

By the way of example and not by limitation, the DNS servers can be set up using the following PowerShell script:

```
$allsubs = Get-AzSubscription
$DNSIPs = "10.8.39.133", "10.8.39.132"
foreach($sub in $allSubs)
{
    Set-AzContext -SubscriptionObject $sub
    $allvnets = Get-AzVirtualNetwork
    foreach ($vnet in $allvnets)
    {
        if(!$vnet.DhcpOptions)
        {
            $vnet.DhcpOptions.dnsservers = $DNSIPs[0]
        }
        Set-AzVirtualNetwork -VirtualNetwork $vnet
        $vnet.DhcpOptions.DnsServers
    }
}
```

Figure 4:
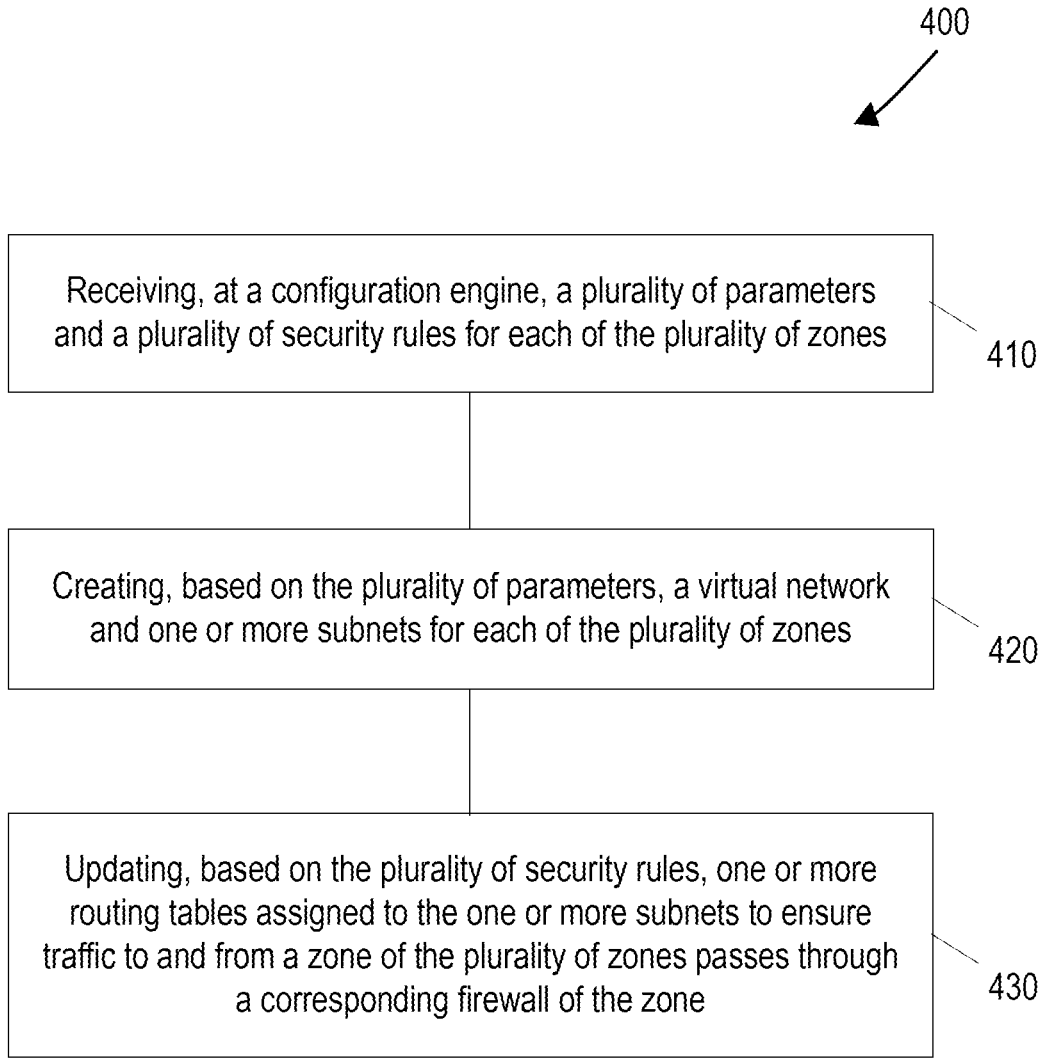
FIG. 4 illustrates a flowchart of an example method for improving configurability and compliance of a cloud-computing environment.

FIG. 4 illustrates a flowchart of an example method 400 for improving configurability and compliance of a cloud-computing environment. The method 400 includes, at operation 410, receiving, at a configuration engine, a plurality of parameters and a plurality of security rules for each of the plurality of zones.

The method 400 includes, at operation 420, creating, based on the plurality of parameters, a virtual network and one or more subnets for each of the plurality of zones.

The method 400 includes, at operation 430, updating, based on the plurality of security rules, one or more routing tables assigned to the one or more subnets to ensure traffic to and from a zone of the plurality of zones passes through a corresponding firewall of the zone.

In some embodiments, each of the plurality of zones is configured to host each of a plurality of workloads on the corresponding virtual network, and each of the plurality of workloads is compliant with at least one standard.

In some embodiments, at least one of plurality of zones can communicate, using a virtual network gateway, with an entity external to the cloud-computing environment.

In some embodiments, the method 400 further includes the operation of cutting off, upon a determination that at least a portion of the traffic is attempting to bypass the corresponding firewall, network connectivity for the zone.

In some embodiments, the plurality of zones comprises a public zone, a private zone, an intermediate zone, and a demilitarized zone.

In some embodiments, the at least one standard comprises a Health Insurance Portability and Accountability Act (HIPAA) standard, a National Institute of Standards and Technology (NIST) standard, or a Health Information Trust Alliance (HITRUST) standard.

In some embodiments, the plurality of parameters and the plurality of security rules are received in an automation script.

Figure 5:
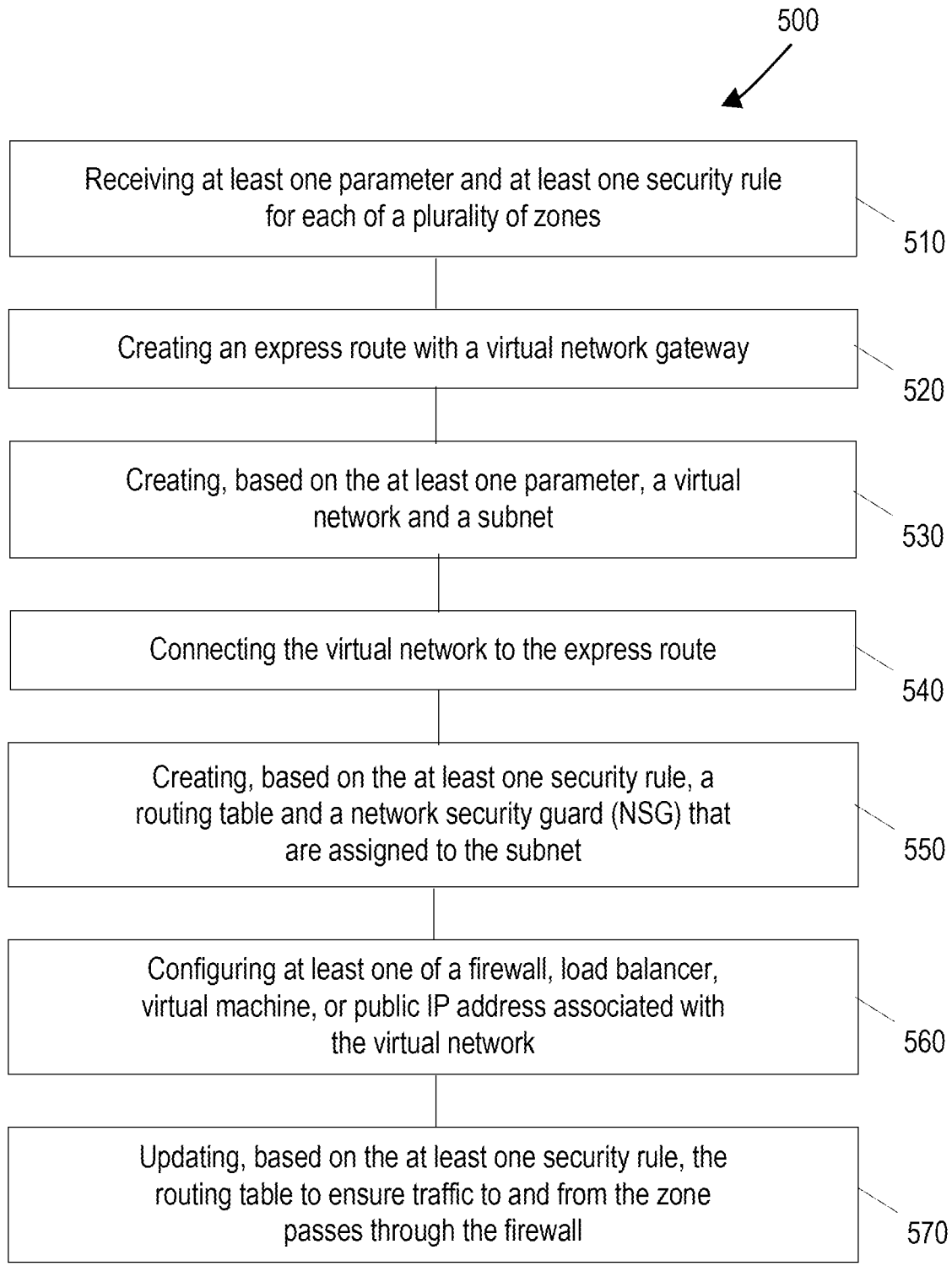
FIG. 5 illustrates a flowchart of another example method for improving configurability and compliance of a cloud-computing environment.

FIG. 5 illustrates a flowchart of an example method 500 for improving configurability and compliance of a cloud-computing environment. The method 500 includes, at operation 510, receiving at least one parameter and at least one security rule for each of a plurality of zones.

The method 500 includes, at operation 520, creating an express route with a virtual network gateway.

The method 500 includes, at operation 530, creating, based on the at least one parameter, a virtual network and a subnet.

The method 500 includes, at operation 540, connecting the virtual network to the express route.

The method 500 includes, at operation 550, creating, based on the at least one security rule, a routing table and a network security guard (NSG) that are assigned to the subnet.

The method 500 includes, at operation 560, configuring at least one of a firewall, load balancer, virtual machine, or public IP address associated with the virtual network.

The method 500 includes, at operation 570, updating, based on the at least one security rule, the routing table to ensure traffic to and from the zone passes through the firewall.

In some embodiments, the method 500 further includes the operation of creating a virtual network peering that enables the virtual network to communicate one or more other virtual networks.

In some embodiments, the virtual network is configured to allow traffic forwarding, use a remote gateway, or allow gateway transit capabilities.

In some embodiments, the routing table comprises one-hop entries.

In some embodiments, the at least one parameter and the at least one security rule are received in an automation script.

In some embodiments, the zone is a public zone, a private zone, an intermediate zone, or a demilitarized zone.

In some embodiments, the at least one standard comprises a Health Insurance Portability and Accountability Act (HIPAA) standard, a National Institute of Standards and Technology (NIST) standard, or a Health Information Trust Alliance (HITRUST) standard.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). In an example, the binary neural network may be implemented on an ASIC or FPGA.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for improving configurability and compliance of a cloud-computing environment comprising a plurality of zones, the system comprising:
  a processor and a memory including instructions stored thereupon, wherein the instructions upon execution by the processor cause the processor to:
    receive an automation script comprising at least one parameter and at least one security rule for each of the plurality of zones, and for each of the plurality of zones:

create an express route with a virtual network gateway, create, based on the at least one parameter from the automation script, a virtual network and a subnet, connect the virtual network to the express route, create, based on the at least one security rule from the automation script, a routing table and a network security guard (NSG) that are assigned to the subnet, configure at least one of a firewall, load balancer, virtual machine, or public IP address associated with the virtual network, and update, based on the at least one security rule, the routing table to ensure traffic to and from a zone of the plurality of zones passes through the firewall, wherein the zone is configured to host a workload on the virtual network, and wherein the workload is compliant with at least one standard.

2. The system of claim 1, wherein the instructions upon execution by the processor further cause the processor to:

create a virtual network peering that enables the virtual network to communicate one or more other virtual networks.

3. The system of claim 2, wherein the virtual network is configured to allow traffic forwarding, use a remote gateway, or allow gateway transit capabilities.

4. The system of claim 1, wherein the routing table comprises one-hop entries.

5. The system of claim 1, wherein the zone is a public zone, a private zone, an intermediate zone, or a demilitarized zone.

6. The system of claim 1, wherein the at least one standard comprises a Health Insurance Portability and Accountability Act (HIPAA) standard, a National Institute of Standards and Technology (NIST) standard, or a Health Information Trust Alliance (HITRUST) standard.

7. A method for improving configurability and compliance of a cloud-computing environment comprising a plurality of zones, the method comprising:

receiving, at a configuration engine, an automation script comprising a plurality of parameters and a plurality of security rules for each of the plurality of zones;

creating, based on the plurality of parameters from the automation script, a virtual network and one or more subnets for each of the plurality of zones; and updating, based on the plurality of security rules from the automation script, one or more routing tables assigned to the one or more subnets to ensure traffic to and from a zone of the plurality of zones passes through a corresponding firewall of the zone, wherein each of the plurality of zones is configured to host each of a plurality of workloads on a corresponding virtual network, and wherein each of the plurality of workloads is compliant with at least one standard.

8. The method of claim 7, wherein at least one of the plurality of zones can communicate, using a virtual network gateway, with an entity external to the cloud-computing environment.

9. The method of claim 8, wherein the entity is an internet or an internet-of-things (IoT) management and security center.

10. The method of claim 7, further comprising:

cutting off, upon a determination that at least a portion of the traffic is attempting to bypass the corresponding firewall, network connectivity for the zone.

11. The method of claim 7, wherein the plurality of zones comprises a public zone, a private zone, an intermediate zone, and a demilitarized zone.

12. The method of claim 7, wherein the at least one standard comprises a Health Insurance Portability and Accountability Act (HIPAA) standard, a National Institute of Standards and Technology (NIST) standard, or a Health Information Trust Alliance (HITRUST) standard.

13. A non-transitory computer-readable storage medium having instructions stored thereupon for improving configurability and compliance of a cloud-computing environment comprising a plurality of zones, the non-transitory computer-readable storage medium comprising:

instructions for receiving, at a configuration engine, an automation script comprising a plurality of parameters and a plurality of security rules for each of the plurality of zones;

instructions for creating, based on the plurality of parameters from the automation script, a virtual network and one or more subnets for each of the plurality of zones; and instructions for updating, based on the plurality of security rules from the automation script, one or more routing tables assigned to the one or more subnets to ensure traffic to and from a zone of the plurality of zones passes through a corresponding firewall of the zone, wherein each of the plurality of zones is configured to host each of a plurality of workloads on a corresponding virtual network, and wherein each of the plurality of workloads is compliant with at least one standard.

14. The non-transitory computer-readable storage medium of claim 13, wherein at least one of the plurality of zones can communicate, using a virtual network gateway, with an entity external to the cloud-computing environment.

15. The non-transitory computer-readable storage medium of claim 14, wherein the entity is an internet or an internet-of-things (IoT) management and security center.

16. The non-transitory computer-readable storage medium of claim 13, wherein the plurality of zones comprises a public zone, a private zone, an intermediate zone, and a demilitarized zone.

17. The non-transitory computer-readable storage medium of claim 13, wherein the at least one standard comprises a Health Insurance Portability and Accountability Act (HIPAA) standard, a National Institute of Standards and Technology (NIST) standard, or a Health Information Trust Alliance (HITRUST) standard.

* * * * *